(12) United States Patent
McCain et al.

(10) Patent No.: US 12,134,031 B2
(45) Date of Patent: *Nov. 5, 2024

(54) METHOD FOR PREDEFINING IN AN XR SPACE AN ENTRYWAY CORRESPONDING TO A REAL ENTRYWAY

(71) Applicants: Sony Group Corporation, Tokyo (JP); Sony Corporation of America, New York, NY (US)

(72) Inventors: Robert M. McCain, Chandler, AZ (US); Tsubasa Tsukahara, Los Angeles, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 539 days.

This patent is subject to a terminal disclaimer.

(21) Appl. No.: 17/488,245

(22) Filed: Sep. 28, 2021

(65) Prior Publication Data

US 2023/0096959 A1 Mar. 30, 2023

(51) Int. Cl.
*A63F 13/25* (2014.01)
*G06F 3/04815* (2022.01)
*G06T 19/00* (2011.01)

(52) U.S. Cl.
CPC .......... *A63F 13/25* (2014.09); *G06F 3/04815* (2013.01); *G06T 19/006* (2013.01); *A63F 2300/308* (2013.01); *A63F 2300/8082* (2013.01)

(58) Field of Classification Search
CPC ............. A63F 13/25; A63F 2300/8082; G06T 19/006; G06F 3/05815
See application file for complete search history.

(56) References Cited

U.S. PATENT DOCUMENTS

| | | |
|---|---|---|
| 10,255,302 B1 | 4/2019 | Cosic |
| 10,928,973 B2 | 2/2021 | Shuster |
| 11,804,012 B1 * | 10/2023 | Kovacs ................... A63F 13/65 |
| 11,890,534 B2 * | 2/2024 | McCain ................ G06V 20/20 |
| 2020/0184221 A1 * | 6/2020 | Alexander ............. G06V 20/13 |
| 2020/0279438 A1 | 9/2020 | Ohashi |

FOREIGN PATENT DOCUMENTS

| | | |
|---|---|---|
| EP | 3459071 | 3/2019 |
| WO | WO-2016077798 A1 | 5/2016 |
| WO | WO-2020005732 A1 | 1/2020 |

\* cited by examiner

*Primary Examiner* — Corbett B Coburn
(74) *Attorney, Agent, or Firm* — Trellis IP Law Group, PC

(57) ABSTRACT

A method for predefining an entryway, corresponding to a real entryway, for an object entering or leaving an extended reality (XR) space contained within a real environment includes: accessing a spatial mapping mesh (SMM) for the real environment, and a sealed space mesh (SSM) for the XR space; analyzing polygons in the SMM and SSM to identify first subsets representing real boundary walls and virtual wall boundaries respectively; filtering the first subsets according to first criteria to yield second subsets; colliding polygons across the second subsets to yield a third subset of SSM polygons; defining groups of connected SSM polygons within the third subset based on proximity; and selecting one group as defining the entryway. The entryway is predefined in advance of user interaction with any virtual elements in the XR space.

20 Claims, 6 Drawing Sheets

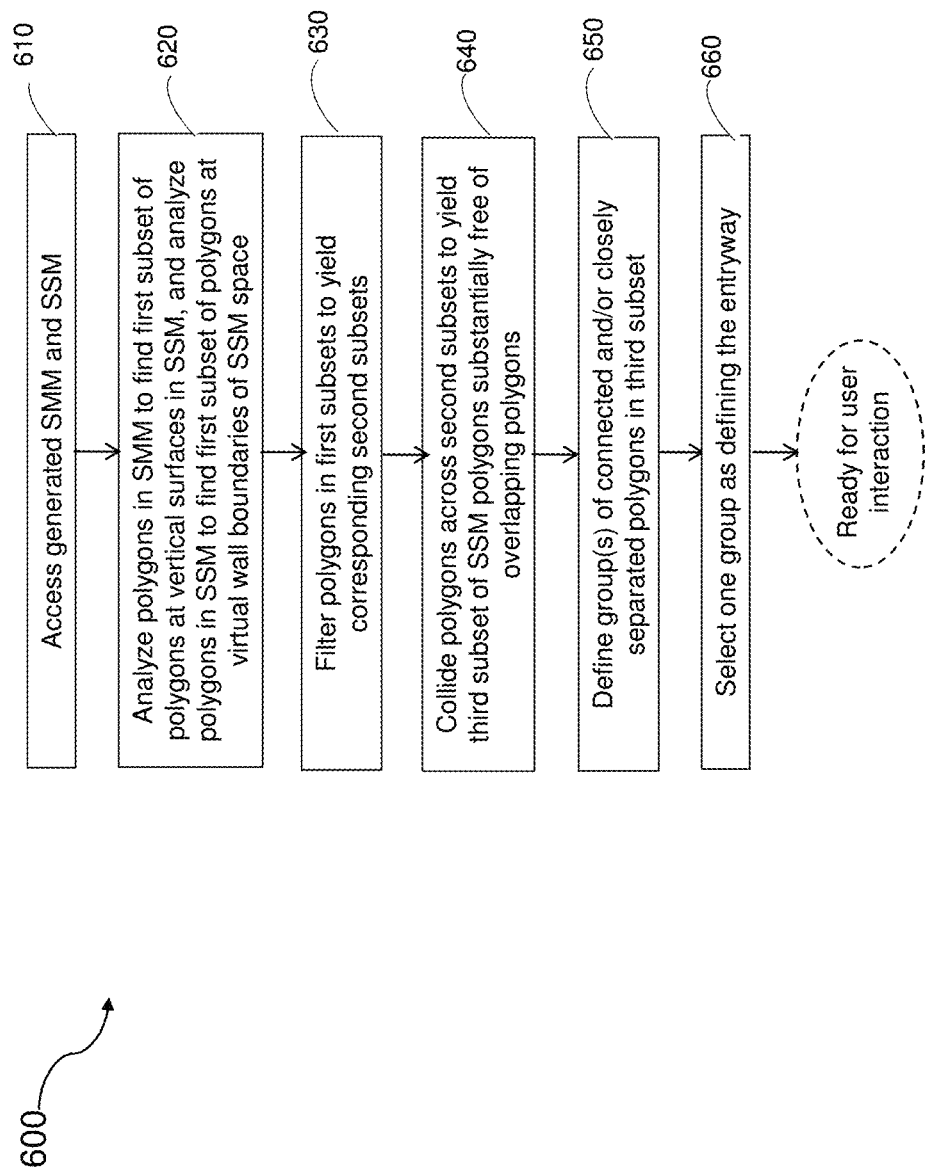

METHOD FOR PREDEFINING IN AN XR SPACE AN ENTRYWAY CORRESPONDING TO A REAL ENTRYWAY

CROSS REFERENCES TO RELATED APPLICATIONS

This application is related to the following applications:
U.S. Pat. No. 11,890,534, entitled "METHOD FOR PREDEFINING A VIRTUAL ENTRYWAY AT A VIRTUAL BOUNDARY OF AN XR SPACE", issued on Feb. 6, 2024 (020699-118400US/SYP340053US01);
U.S. Pat. No. 11,612,817, entitled "METHOD FOR PREDEFINING ACTIVITY ZONES IN AN EXTENDED REALITY (XR) ENVIRONMENT", issued on Mar. 28, 2023 (020699-118500US/SYP340054US01);
U.S. Pat. No. 11,596,866, entitled "METHOD TO USE RECOGNITION OF NEARBY PHYSICAL SURFACES TO GENERATE NPC REACTIONS TO EVENTS", issued on Mar. 7, 2023 (020699-118600US/SYP340055US01);
U.S. Pat. No. 11,759,711, entitled "METHOD FOR QUASI-RANDOM PLACEMENT OF VIRTUAL ITEMS IN AN EXTENDED REALITY (XR) SPACE", issued on Sep. 19, 2023 (020699-118700US/SYP340055US01);
U.S. Pat. No. 11,944,905, entitled "METHOD TO REGULATE JUMPS AND FALLS BY PLAYABLE CHARACTERS IN XR SPACES", issued on Apr. 2, 2024 (020699-118800US/SYP340057US01);
U.S. Pat. No. 11,617,949, entitled "METHODS FOR PREDEFINING VIRTUAL STAIRCASES CONNECTING PLATFORMS IN EXTENDED REALITY (XR) ENVIRONMENTS", issued on Apr. 4, 2023 (020699-118900US/SYP340058US01);
And U.S. Pat. No. 11,684,848, entitled "METHOD TO IMPROVE USER UNDERSTANDING OF XR SPACES BASED IN PART ON MESH ANALYSIS OF PHYSICAL SURFACES", issued on Jun. 27, 2023 (020699-119000US/SYP340059US01);
each of which are hereby incorporated by reference as if set forth in full in this application for all purposes.

BACKGROUND

While virtual reality (VR) technologies aim to immerse a user in artificially generated or synthesized environments inspired by real or imaginary environments, augmented reality (AR) technologies superimpose synthesized elements onto a real environment to which the user is exposed. The term mixed reality (MR) is used to refer to technologies that combine VR and AR, allowing a user to interact in real time with real and synthesized elements. More generally, the term extended reality or XR is used to encompass all three terms, although it is often (as in this disclosure) used interchangeably with MR.

Games, marketing and training are among the main applications for XR technology. This disclosure will focus on XR games, but it should be appreciated that there are many other applications for XR technology, including, for example, product marketing, and skills training, and many of the ideas discussed herein could be applied to any of these areas without departing from the spirit or scope of the invention.

A primary goal of the game developer is to provide the user with as fully immersive an experience as possible, in which the user can interact naturally with either real or synthesized (virtual) elements, and in which the virtual characters or objects behave "naturally" even though the real elements making up the physical environments in which the user may want to play-in different rooms in their home, or office, for example—will normally be completely unknown to the game developer. In currently available XR applications, this goal is far from being achieved.

Consider, for example, a typical case of an XR game designed to be played in a defined space contained within a larger, real environment which is bounded by real walls with one or more real entryways, such as doorways or windows. The game may involve a synthesized character-a zombie, for example, or a dwarf-entering that defined space, causing other synthesized characters already present, and maybe the game user or their avatar, to react by, for example, backing away, hiding, chasing that new character away, greeting it, or fighting it. In current games, the newly introduced character simply appears out of nowhere at some arbitrary position within the XR space. This obviously does not aid the illusion the developer is trying to create, of that character being a real creature, human or not, who is subject to many of the same rules of physical reality as the user.

There is therefore a need for methods and systems in XR applications that can determine realistic entryways in the XR environments the applications generate, allowing new synthesized characters to either make use of an entryway that is already present in the real environment, or to use a synthesized entryway that is situated appropriately (realistically and preferably unobtrusively) within the XR space. It would of course be desirable for such methods to be computationally efficient, using minimal resources in time and computing power, to determine the entryways and allow them to be displayed to the user as and when appropriate for events or actions occurring in subsequent use of the XR space.

SUMMARY

Embodiments generally relate to methods and systems for predefining entryways for objects entering or leaving an extended reality (XR) space in a real environment, the redefining occurring before user interaction with virtual elements in the XR space.

In one embodiment, a method for predefining an entryway corresponding to a real entryway comprises: accessing a previously generated spatial mapping mesh (SMM) for the real environment, including physical elements throughout the real environment; accessing a previously generated sealed space mesh (SSM) defining the XR space, the SSM being bounded by virtual boundaries, and including all physical elements present in that space; analyzing polygons in the SMM to identify a first SMM subset of polygons representing real walls at boundaries of the SMM, and analyzing polygons in the SSM to identify a first SSM subset of polygons representing virtual wall boundaries of the XR space; and filtering polygons in the first SMM subset and the first SSM subset according to a first set of criteria, to yield a second SMM subset and a second SSM subset respectively. The method further comprises: colliding polygons from the second SMM subset with polygons in the second SSM subset to discard each polygon in the second SSM subset that overlaps any polygon in the second SMM subset by greater than a predetermined percentage threshold, yielding a third subset of SSM polygons; defining one or more groups of SSM polygons within the third subset such that polygons in each group are connected or spaced apart by less than a predetermined distance; and selecting one of the groups of SSM polygons as defining the entryway; wherein the entryway is defined in advance of user interaction with virtual elements in the XR space.

In another embodiment, a system for predefining an entryway corresponding to a real entryway comprises: one or more processors; and logic encoded in one or more non-transitory media for execution by the one or more processors and when executed operable to: access a previously generated spatial mapping mesh (SMM) for the real environment, including physical elements throughout the real environment; access a previously generated sealed space mesh (SSM) defining the XR space, the SSM being bounded by virtual boundaries, and including all physical elements present in that space; analyze polygons in the SMM to identify a first SMM subset of polygons representing real walls at boundaries of the SMM, and analyze polygons in the SSM to identify a first SSM subset of polygons representing virtual wall boundaries of the XR space; and filter polygons in the first SMM subset and the first SSM subset according to a first set of criteria, to yield a second SMM subset and a second SSM subset respectively.

The logic is further operable when executed to: collide polygons from the second SMM subset with polygons in the second SSM subset to discard each polygon in the second SSM subset that overlaps any polygon in the second SMM subset by greater than a predetermined percentage threshold, yielding a third subset of SSM polygons; define one or more groups of SSM polygons within the third subset such that polygons in each group are connected or spaced apart by less than a predetermined distance; and select one of the groups of SSM polygons as defining the entryway. The logic executes in advance of user interaction with virtual elements in the XR space.

In yet another embodiment, a system for predefining, in an XR space, an entryway corresponding to a real entryway comprises: one or more processors; and software encoded in one or more computer-readable media for execution by the one or more processors and when executed operable to: access a previously generated spatial mapping mesh (SMM) for the real environment, including physical elements throughout the real environment; access a previously generated sealed space mesh (SSM) defining the XR space, the SSM being bounded by virtual boundaries, and including all physical elements present in that space; analyze polygons in the SMM to identify a first SMM subset of polygons representing real walls at boundaries of the SMM, and analyze polygons in the SSM to identify a first SSM subset of polygons representing virtual wall boundaries of the XR space; and filter polygons in the first SMM subset and the first SSM subset according to a first set of criteria, to yield a second SMM subset and a second SSM subset respectively.

The software is further operable when executed to: collide polygons from the second SMM subset with polygons in the second SSM subset to discard each polygon in the second SSM subset that overlaps any polygon in the second SMM subset by greater than a predetermined percentage threshold, yielding a third subset of SSM polygons; define one or more groups of SSM polygons within the third subset such that polygons in each group are connected or spaced apart by less than a predetermined distance; and select one of the groups of SSM polygons as defining the entryway. The software executes in advance of user interaction with virtual elements in the XR space.

BRIEF DESCRIPTION OF THE DRAWINGS

FIG. 6 is a flowchart of a method according to some virtual entryway embodiments.

DETAILED DESCRIPTION OF EMBODIMENTS

A further understanding of the nature and the advantages of embodiments disclosed herein may be realized by reference of the remaining portions of the specification and the attached drawings.

Figure 1:
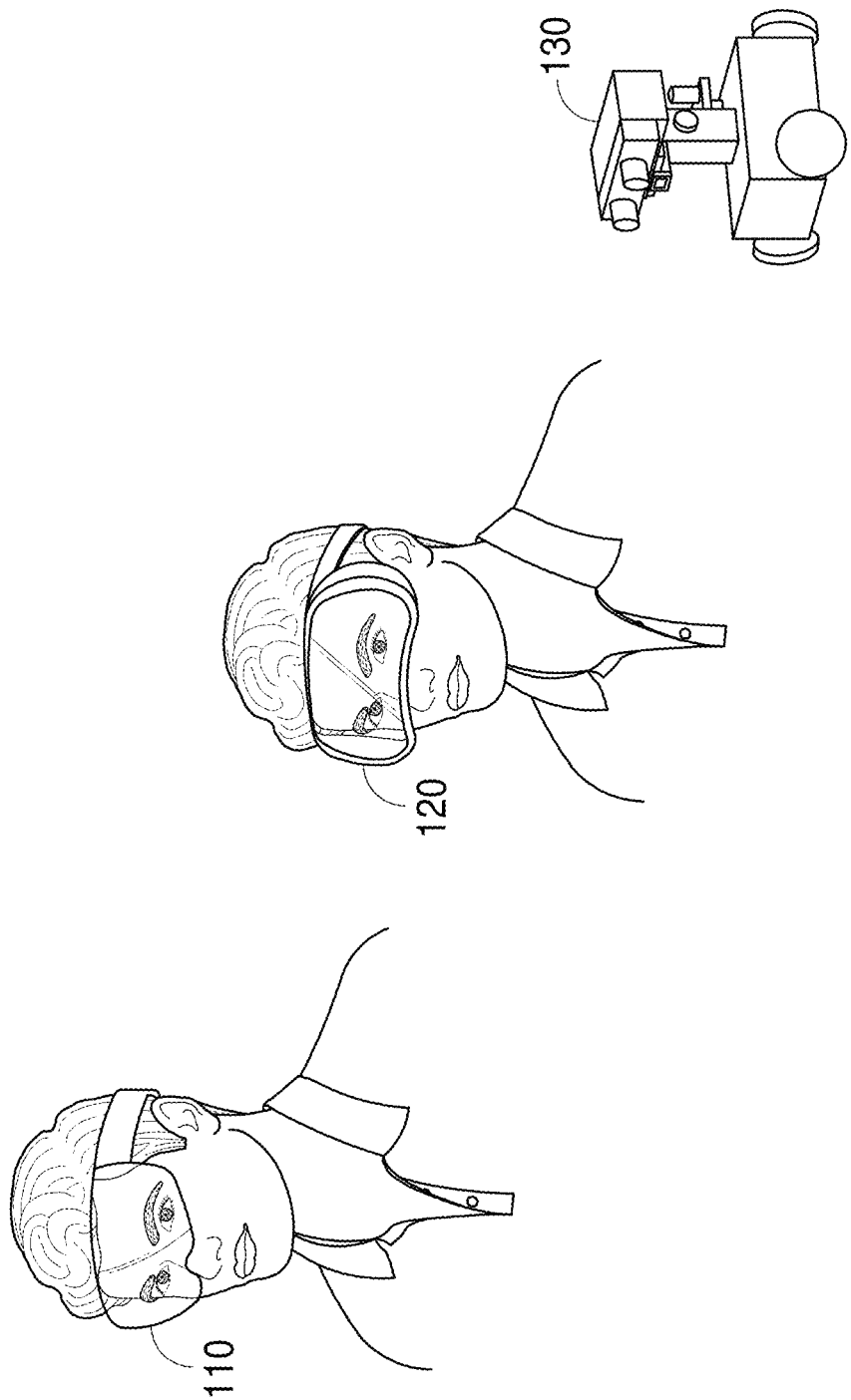
FIG. 1 (prior art) shows devices designed to generate meshes that may be used in some embodiments.

Spatial mapping meshes (SMMs) may be generated by commercially available devices manufactured by gaming and other electronic companies. The devices may be head mounted, carried in the hand, or simply deployed (for example in the form of a robot) by a user to move autonomously around the space of interest, gathering data. Technologies such as e.g., LIDAR, image analysis etc. for creating such meshes are well known and will not be discussed further herein. FIG. 1 (prior art) shows two head mounted sensing and display devices, 110 and 120, and a robotic device 130, as examples of currently available devices by which SMMs and Sealed Space Meshes (SSMs) to be described below can be generated.

A typical resulting SMM is a 3D representation, in the form of enormous numbers (tens or hundreds of thousands) of relatively small 2D polygons, of all visible and tangible surfaces in a given environment, such as within a house, in advance of the user commencing an XR game in a part of that environment, such as within one room of that house. By detecting and showing surfaces of all the physical elements within the house, and therefore within and around the room of interest, all open spaces between elements in that room may, of course, be inferred.

Figure 2:
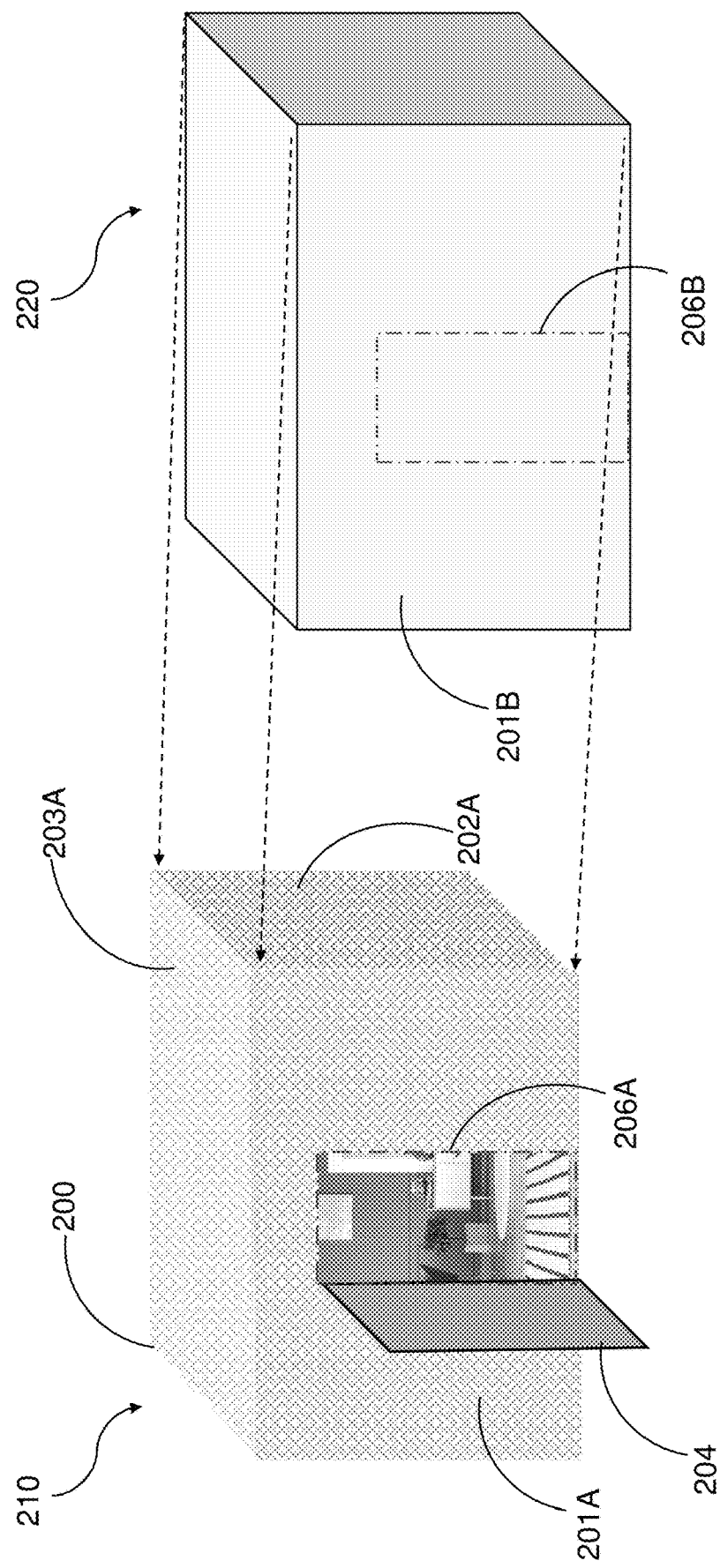
FIG. 2 illustrates an example of a sealed space mesh in an XR environment within a real environment represented by a spatial mapping mesh according to a real entryway set of embodiments.
Figure 3:
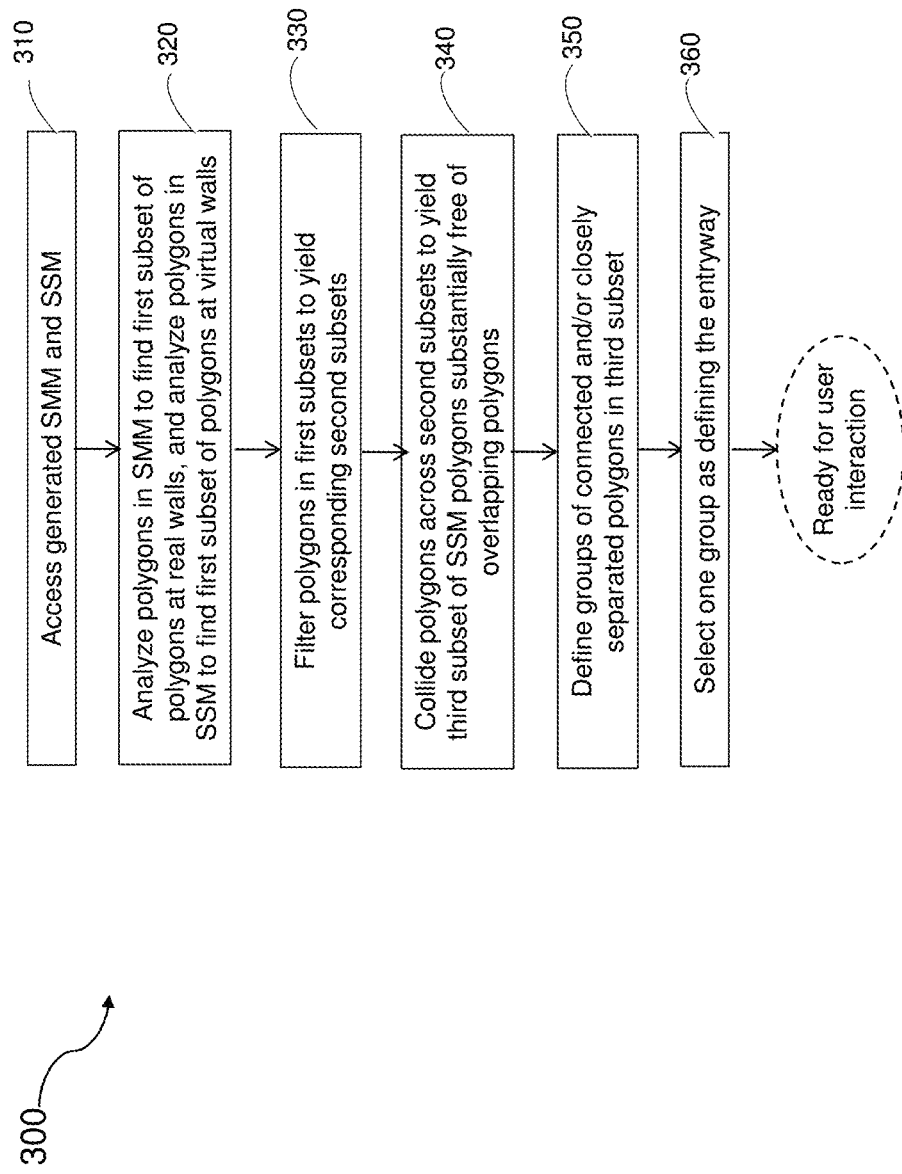
FIG. 3 is a flowchart of a method according to some real entryway embodiments.
Figure 4:
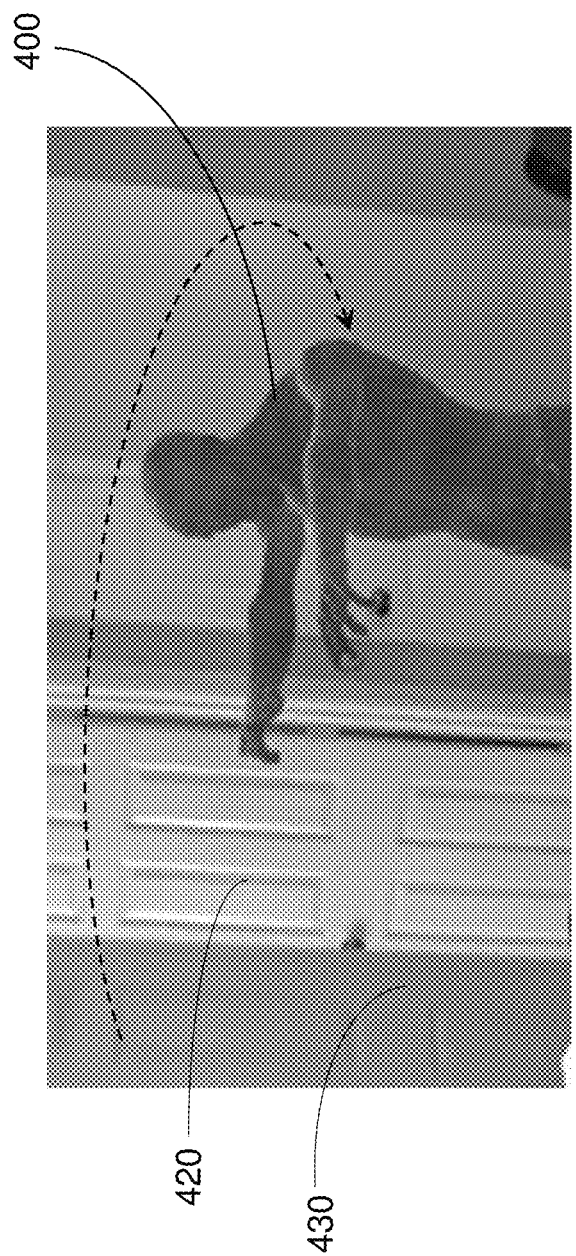
FIG. 4 illustrates an entryway for a character into an XR space, as provided by one real entryway embodiment.

FIGS. 2-4 relate to "real entryway" embodiments.

FIG. 2 illustrates how an environment 200, in this case a simple living room opening off a hallway, may be represented in some embodiments of the present invention by two different types of mapping meshes, and the figure schematically indicates the relationship between the two.

Spatial mapping mesh 210 covers surfaces of all the real physical elements within room 200, such as the floor rug, sofa and potted plant visible in the figure, as well as the room's internal boundary surfaces (such as the ceiling, floor, and the inner surfaces of four walls) as well as door 204. The inner surfaces of two walls 201A and 202A and the underside of the ceiling 203A are indicated by hatched surfaces, to indicate the polygons that make up the mesh, but neither the polygons themselves nor hatching at any of the other surfaces are shown, to avoid over-complicating the figure. The figure's rough perspective view of the room may appear to show the upper or outer surface of the ceiling, and outer surfaces of the walls, but it should be understood that the mesh actually covers surfaces as viewed by a room occupant, the intended user of the XR space, as it would have been generated by a mapping device within the room. It should be particularly noted that SMM 210 includes wall surfaces 202A, and the open door 204 but not the open doorway 206A, as of course there is no material object in that open doorway, so no surface for the mesh generating device to register.

In general SMM 210 will include other rooms, hallways, staircases etc throughout the house, but only the part including the room, its contents, and the partly open door is shown in the figure.

In some cases, not shown, there may be other open doors or windows in one or more of the other walls of the room of interest, but for simplicity, the case of just one open doorway is considered here.

Sealed space meshes (SSMs) are generated using the same technologies as noted above for SMMs, but differ, as their name suggests, in being confined to a "sealed" environment, so that an XR space is sharply defined for the game (or other XR application) of interest. While including all the surfaces of real objects present within the space to be "sealed", the SMM also includes virtual walls, represented by enormous numbers of polygons just as real walls would be, at the boundaries of that space. This allows the virtual elements-which may be characters or inanimate objects-making up the XR game to be generated and to operate only within the confines of the SMM virtual walls.

In the example illustrated in FIG. 2, the SSM 220 for room 200 is shown displaced to the right and slightly below SMM 210 for clarity, but in practice, of course, it would exactly overlap the dimensions of room 200, with the dashed arrows indicating where matching corners of the room and points of the two meshes representing those corners would meet.

A critical difference between SMM 210 and SSM 220 for embodiments of the present invention relevant to FIG. 2 is that in the SMM, the surface of the front wall 201A (shown hatched) is not a simple rectangle but is broken by open space 206A, due to the door 204 being open, but in the SSM, all virtual walls, including 201B are deliberately created to be whole, or seamless. A dashed outline 206B at the position corresponding to the real doorway is shown in the figure for explanatory purposes, but it does not correspond to any feature present in SSM 220.

Conceptually, it may readily be seen that a direct comparison between the real walls of SMM 210 and the virtual walls of SSM 220 will reveal a discrepancy only at the position of the real doorway, allowing that position to be identified as a potentially suitable position to define an entryway for one or more characters in the XR game to be played within room 200. The details of how this process may be accomplished will now be discussed.

FIG. 3 is a flowchart illustrating steps of method 300 according to various embodiments of the present invention for the type of scenario shown in FIG. 2.

At step 310, a Spatial Mapping Mesh and a Sealed Space Mesh, previously generated using one or more devices as discussed above are obtained. It should be noted that for embodiments of the type represented in simplified form by FIG. 2, and which may be addressed by method 300, at least a part of each of the virtual walls of the SSM coincides with a corresponding part of a real wall in the room.

At step 320, the polygons making up the surfaces identified in the SMM are analyzed to identify all polygons representing portions of surfaces of real walls, and the polygons making up the corresponding surfaces identified in the SSM are analyzed to identify all polygons representing portions of surfaces of virtual walls. These identified polygons make up a first SMM subset of polygons and a first SSM subset of polygons respectively. The essential part of the analysis is selecting polygons that meet a predetermined threshold of angularity or verticality, such that they could represent walls. A typical threshold is +/−30 degrees from a perfectly vertical axis relative to ground.

At step 330, all polygons in the first SMM subset and the first SSM subset are filtered according to a first set of criteria, to yield a second SMM subset and a second SSM subset respectively. This filtering step is very important in reducing the number of polygons that need to be processed in subsequent steps of the method. Typically, these criteria will include a height threshold, to ensure that resources are not wasted in defining entryways extending vertically well above the height of any character in the game expected to enter or leave thereby. For example, a synthesized character X ft tall and capable of extending their arms to a maximum of Y ft upwards, may be well served by an entryway of no more than 1.1*(X+Y) ft, so that distance would be the height threshold criterion. In some embodiments, the criteria may also include an angularity or verticality threshold that serves to exclude polygons representing surfaces that have angles close to those of walls but actually do not correspond to walls-fairly flat objects leaning against a wall, for example.

At step 340, a collision process is performed, in which polygons from the second SMM subset are collided with polygons in the second SSM subset to discard each polygon in the second SSM subset that overlaps any polygon in the second SMM subset by greater than a predetermined percentage threshold, yielding a third subset of SSM polygons. For the purposes of this disclosure, the term "overlaps" is defined to include a partial overlapping, where the area of overlapping contact of one polygon with another at that same approximate spatial position is less than 100% of the area of either polygon, as well a a full "collision" of the entire area of each. In some embodiments, a reasonable choice of threshold percentage is 70%.

At step 350, groups of connected and/or closely separated polygons in the third subset of SSM polygons are defined, where within each group, each polygon is either in contact along at least one edge with another polygon, or is separated from its nearest neighboring polygon by less than a predetermined distance. In some embodiments, the predetermined distance is 10 mm.

At step 360, one of the defined groups of polygons is selected as defining the entryway. The selection is based at least in part on a second set of criteria. Typically, these criteria will include a size threshold, accommodating a characteristic dimension of the object that may enter or leave the room through that entryway, to ensure the entryway is functional. In some embodiments, the shape of the group may be another criterion favoring one group over another, possibly echoing the shape of the object for esthetic if not functional reasons. In some cases, the largest group that satisfies the criteria may be preferred over others.

Method 300 is essentially complete after step 360 has been carried out, allowing a character in an XR game (or other application) subsequently set in the XR space addressed by the method to enter or leave the space using that entryway in a manner that is believable to the user.

In some embodiments, not shown, a graphic overlay may be added during a subsequent XR game at the location of the entryway, outlining the entryway perimeter, to make the appearance or exit of a character at that location more credible and/or dramatic. In other embodiments, that portion of the virtual wall may simply be left transparent without any changes to the surrounding wall appearance, so that the user within the room may see the partly open door and external hallway exactly as they really are.

In some embodiments, more than one of the defined groups of polygons may satisfy the second set of criteria, each therefore being a reasonable choice. In some of these cases, the selection may be made by choosing whichever one of those groups covers a larger area than any area covered by any other of those groups. In other cases, whichever group covers the smallest area that nevertheless satisfies the second set of criteria may be preferred. In yet other cases, more than one entryway may be found acceptable.

In some embodiments, method 300 may be modified to allow for the separate passage of characters of different sizes and shapes in the XR game, by defining more than one entryway, differently sized, shaped and positioned-a full-sized open doorway for a falconer, for example, as well as a window opening for their bird of prey to fly through.

FIG. 4 shows how part of an entryway 430, defined according to method 400, may appear during a game involving the entrance of a zombie character 400. The real, partly open door 420 is visible to the user. The dashed line simply shows the path of the entering zombie to aid the understanding (of a reader of this disclosure) of the figure. Seeing the zombie enter through a doorway that the user knows truly exists may greatly aid the illusion of realism which the game developer is trying to create.

Figure 5:
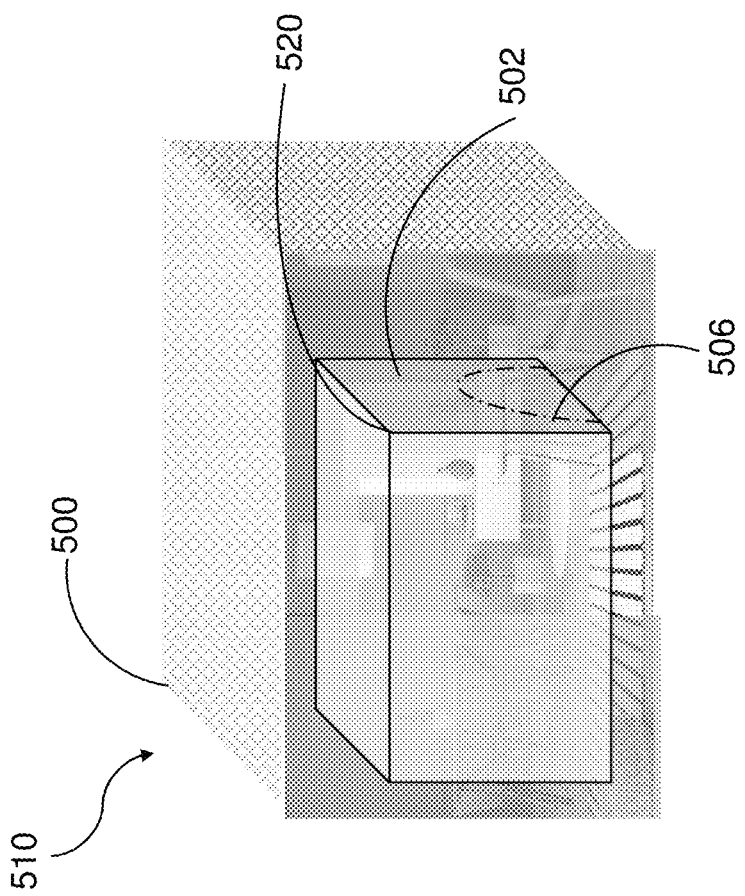
FIG. 5 illustrates a sealed space mesh in an XR environment within a real environment represented by a spatial mapping mesh according to a virtual entryway embodiment.

FIGS. 5-6 relate to "virtual entryway" embodiments.

FIG. 5 illustrates how an environment 500, in this case a simple living room opening off a hallway as in FIG. 2, may be represented in some other embodiments of the present invention by the same two different types of mapping meshes discussed above. These are embodiments in which a primary goal is to create a synthesized entryway into a defined XR space, where the entryway's dimensions and positioning are appropriate to allow a character in the game that will be played subsequently in that space to enter or leave the space in a believable way, if and when necessary in the course of the game.

FIG. 5 shows Sealed Space Mesh 520 within room 500. SSM 520 defines an XR space smaller than the room itself, so that virtual walls bounding 520 do not coincide with real physical walls bounding the room even to the extent that corresponding walls did in the embodiments described above, one of which was illustrated in FIG. 2, where the only discrepancies were at physically real entryways to the room. To make the difference clear, SSM 520 is shown as being much smaller in all three dimensions (width, length and height) than the room itself, although this need not always be the case.

Some wall surfaces and the ceiling of room 500 are shown hatched to indicate corresponding surfaces in Spatial Mapping Mesh 510, but the only elements in SMM 510 of relevance to the XR space to be used in the game are elements (tables, chairs, etc.) contained within the virtual boundaries of SSM 520. Making sure that elements in the room do not unduly restrict access to the entryway is obviously an important restriction on where a synthesized entryway may be positioned. Dashed outline 506 in the virtual sidewall boundary 502 indicates one possible entryway of this type. Conceptually, it may readily be seen that a direct comparison between the virtual walls of SSM 520 and surfaces of real elements in the portion of SMM 510 contained within the volume defined by SSM 520 will reveal a discrepancy at any position where there is empty space in the real environment at a virtual wall location, allowing that location to be identified as a potentially suitable position to define a synthesized entryway. The details of how this process may be accomplished with a reasonable likelihood of success without expending undue computational resources will now be discussed, with reference to FIG. 5.

FIG. 6 is a flowchart illustrating steps of method 600 according to various embodiments of the present invention for the type of scenario shown in FIG. 5.

At step 610, a Spatial Mapping Mesh and a Sealed Space Mesh, previously generated using one or more devices as discussed above are obtained. As noted above, for embodiments of the type represented in simplified form by FIG. 6, and which may be addressed by method 600, no virtual wall of the SSM coincides with any corresponding part of a real wall in the room.

At step 620, the polygons making up the surfaces identified in the SMM are analyzed to identify all polygons representing portions of surfaces of real elements enclosed within the space defined by the SSM, and the polygons making up the surfaces identified in the SSM are analyzed to identify all polygons representing portions of surfaces of its virtual boundaries. The essential part of the analysis is selecting polygons that meet a predetermined threshold of verticality, to ensure that they do represent boundary walls in the SSM, and coincident or adjacent vertical surfaces of other elements in the SMM. The polygons identified at step 20 make up a first SMM subset of polygons and a first SSM subset of polygons respectively.

At step 630, all polygons in the first SMM subset and the first SSM subset are filtered according to a first set of criteria, to yield a second SMM subset and a second SSM subset respectively. This filtering step is very important in reducing the number of polygons that need to be processed in subsequent steps of the method. Typically, these criteria will include a height threshold, to ensure that resources are not wasted in defining entryways extending vertically well above the height of any character in the game expected to enter or leave thereby. It should be noted that characters in games are often much smaller than humans, requiring correspondingly smaller entryways than would be present in a real house.

At step 640, a collision process is performed, in which polygons from the second SMM subset are collided with polygons in the second SSM subset to discard each polygon in the second SSM subset that overlaps any polygon in the second SMM subset by greater than a predetermined percentage threshold, yielding a third subset of SSM polygons. For the purposes of this disclosure, the term "overlaps" is defined to include a partial overlapping, where the area of overlapping contact of one polygon with another at that same approximate spatial position is less than 100% of the area of either polygon, as well a a full "collision" of the entire area of each. In some embodiments, a reasonable choice of threshold percentage is 70%.

The resulting third subset should therefore contain SSM virtual boundary polygons that are relatively unobstructed by vertical surfaces of physical elements.

At step 650, groups of connected and/or closely separated polygons in the third subset of SSM polygons are defined, where within each group, each polygon is either in contact along at least one edge with another polygon, or is separated from its nearest neighboring polygon by less than a predetermined distance. In some embodiments, the predetermined distance is 10 mm.

At step 660, one of the defined groups of polygons is selected as defining the synthesized entryway, with a corresponding area typically shown as transparent in a subsequent XR game. The selection is based at least in part on a second set of criteria. Typically, these criteria will include a size threshold, characteristic of the object that will enter or leave the room through that entryway, to ensure the entryway is functional. In some embodiments, the shape of the group may be another criterion favoring one group over another, possibly echoing the shape of the object for esthetic if not functional reasons.

Method 600 is essentially complete after step 660 has been carried out, allowing a character in an XR game (or other application) subsequently set in the XR space addressed by the method to enter or leave the space using the synthesized entryway in a manner that is believable to the user.

Normally, to aid the illusion of reality, the virtual boundaries of the SSM space are not visible during an XR game, and so, unlike the case for embodiments discussed above for real entryways, the user of a subsequent XR game to be played in the XR space will not be able to see the synthesized entryway unless and until deliberate measures are taken to display an outline of its perimeter during that game, using a graphic overlay. This will mean rendering at least part of the virtual boundary wall in which the entryway is positioned visible so that the opening may be seen. In some cases, it may be desirable to only display the virtual boundary wall and its corresponding entryway at times when the character of interest is either about to "enter" the XR space there, or is approaching its position from within the XR space to make an exit. This may be helpful in not only conserving computing resources used for the display but also avoiding distracting the user when the entryway presence is not relevant to the current gameflow.

In some embodiments, more than one of the defined groups of polygons may satisfy the second set of criteria, each therefore being a reasonable choice. In some of these cases, the selection may be made by choosing whichever one of those groups covers a larger surface area than any area covered by any other of those groups. In others, more than one entryway may be defined.

In some embodiments, method 600 may be modified to allow for the passage of characters of different sizes and shapes in the XR game, by defining more than one entryway, differently sized, shaped and positioned as appropriate to their appearance and presumed physical movement characteristics.

Embodiments of the present invention provide many benefits. In particular, they allow one or more entryways at boundaries of an XR space to be defined, providing a user of a game subsequently played in that space to experience a greater sense of immersion in the XR world presented by that game. The numbers of polygons and groups of polygons in the meshes are quickly reduced by successive processes of analyzing, filtering, colliding and selecting on the basis of various criteria as described above, making the overall process computationally efficient. In a typical case—for an average sized living room, for example—the time taken would be less than a minute.

As noted earlier, the present invention is not limited to games alone. One example of a non-gaming application might be an automobile marketing demonstration, where the user (a potential buyer) may be enabled to experience an XR environment in which different parts of the vehicle "fly" in through an open doorway of a large showroom or garage, to self-assemble right in front of the user. The goal in this case may not be realism as much as a "wow" factor! Another example might be a medical training exercise, in which synthesized patients enter an examination room, exhibiting gaits indicative of various physical ailments as they walk in. Many other examples may be envisaged.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general-purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for predefining an entryway, corresponding to a real entryway, for an object entering or leaving an extended reality (XR) space contained within a real environment; the method comprising:
accessing a previously generated spatial mapping mesh (SMM) for the real environment, including physical elements throughout the real environment;
accessing a previously generated sealed space mesh (SSM) defining the XR space, the SSM being bounded by virtual boundaries, and including all physical elements present in that space;
analyzing polygons in the SMM to identify a first SMM subset of polygons representing real walls at boundaries of the SMM, and analyzing polygons in the SSM to identify a first SSM subset of polygons representing virtual wall boundaries of the XR space;
filtering polygons in the first SMM subset and the first SSM subset according to a first set of criteria, to yield a second SMM subset and a second SSM subset respectively;
colliding polygons from the second SMM subset with polygons in the second SSM subset to discard each polygon in the second SSM subset that overlaps any polygon in the second SMM subset by greater than a predetermined percentage threshold, yielding a third subset of SSM polygons;
defining one or more groups of SSM polygons within the third subset such that polygons in each group are connected or spaced apart by less than a predetermined distance; and
selecting one of the groups of SSM polygons as defining the entryway;
wherein the entryway is defined in advance of user interaction with virtual elements in the XR space.

2. The method of claim 1, wherein analyzing polygons in the SMM and the SSM comprises identifying polygons with an angularity indicative of a vertical surface.

3. The method of claim 1, wherein the first set of criteria includes at least one of a height threshold and a verticality threshold.

4. The method of claim 1, wherein the predetermined percentage threshold is 70%.

5. The method of claim 1, wherein the selecting is based at least in part on a second set of criteria including a size threshold, accommodating a characteristic dimension of the object.

6. The method of claim 5, wherein, if more than one group satisfies the second set of criteria, the selecting further comprises choosing whichever one of those groups covers a larger area than any area covered by any other of those groups.

7. The method of claim 1, wherein the object is a character in a game designed to be played in XR spaces.

8. The method of claim 7, wherein the SMM and SSM were generated by a device worn, carried, or deployed by a user of the game.

9. A system for predefining an entryway, corresponding to a real entryway, for an object entering or leaving an extended reality (XR) space contained within a real environment; the system comprising:
one or more processors; and
logic encoded in one or more non-transitory media for execution by the one or more processors and when executed operable to:
access a previously generated spatial mapping mesh (SMM) for the real environment, including physical elements throughout the real environment;
access a previously generated sealed space mesh (SSM) defining the XR space, the SSM being bounded by virtual boundaries, and including all physical elements present in that space;
analyze polygons in the SMM to identify a first SMM subset of polygons representing real walls at boundaries of the SSM, and analysing polygons in the SSM to identify a first SSM subset of polygons representing virtual wall boundaries of the XR space;
filter polygons in the first SMM subset and the first SSM subset according to a first set of criteria, to yield a second SMM subset and a second SSM subset respectively;
collide polygons from the second SMM subset with polygons in the second SSM subset to discard each polygon in the second SSM subset that overlaps any polygon in the second SMM subset by greater than a predetermined percentage threshold, yielding a third subset of SSM polygons;
define one or more groups of SSM polygons within the third subset such that polygons in each group are connected or spaced apart by less than a predetermined distance; and
select one of the groups of SSM polygons as defining the entryway;
wherein the entryway is defined in advance of user interaction with virtual elements in the XR space.

10. The system of claim 9, wherein analyzing polygons in the SMM and the SSM comprises identifying polygons with an angularity indicative of a vertical surface.

11. The system of claim 9, wherein the first set of criteria includes at least one of a height threshold and a verticality threshold.

12. The system of claim 9, wherein the predetermined percentage threshold is 70%.

13. The system of claim 9, wherein the selecting is based at least in part on a second set of criteria including a size threshold, accommodating a characteristic dimension of the object.

14. The system of claim 13, wherein, if more than one group satisfies the second set of criteria, the selecting further comprises choosing whichever one of those groups covers a larger area than an area covered by any other of those groups.

15. The system of claim 9, wherein the object is a character in a game designed to be played in XR spaces.

16. The system of claim 15, wherein the SMM and SSM were generated by a device worn, carried, or deployed by a user of the game.

17. A system for predefining an entryway, corresponding to a real entryway, for an object entering or leaving an extended reality (XR) space contained within a real environment; the system comprising:
one or more processors; and software encoded in one or more computer-readable media for execution by the one or more processors and when executed operable to:

access a previously generated spatial mapping mesh (SMM) for the real environment, including physical elements throughout the real environment;

access a previously generated sealed space mesh (SSM) defining the XR space, the SSM being bounded by virtual boundaries, and including all physical elements present in that space;

analyze polygons in the SMM to identify a first SMM subset of polygons representing real walls at boundaries of the SSM, and analysing polygons in the SSM to identify a first SSM subset of polygons representing virtual wall boundaries of the XR space;

filter polygons in the first SMM subset and the first SSM subset according to a first set of criteria, to yield a second SMM subset and a second SSM subset respectively;

collide polygons from the second SMM subset with polygons in the second SSM subset to discard each polygon in the second SSM subset that overlaps any polygon in the second SMM subset by greater than a predetermined percentage threshold, yielding a third subset of SSM polygons;

define one or more groups of SSM polygons within the third subset such that polygons in each group are connected or spaced apart by less than a predetermined distance; and select one of the groups of SSM polygons as defining the entryway;

wherein the entryway is defined in advance of user interaction with virtual elements in the XR space.

18. The system of claim 17, wherein analyzing polygons in the SMM and the SSM comprises identifying polygons with an angularity orientation indicative of a vertical surface.

19. The system of claim 17, wherein the first set of criteria includes at least one of a height threshold and a verticality threshold.

20. The system of claim 17, wherein the selecting is based at least in part on a second set of criteria including a size threshold, accommodating a characteristic dimension of the object.

* * * * *